(12) United States Patent
Li et al.

(10) Patent No.: US 11,002,428 B2
(45) Date of Patent: May 11, 2021

(54) LIGHT REGULATION DEVICE AND LIGHTING DEVICE

(71) Applicant: BOE TECHNOLOGY GROUP CO., LTD., Beijing (CN)

(72) Inventors: Zhongxiao Li, Beijing (CN); Wei Wang, Beijing (CN); Pengxia Liang, Beijing (CN); Wenqing Zhao, Beijing (CN); Xiaochuan Chen, Beijing (CN)

(73) Assignee: BOE TECHNOLOGY GROUP CO., Ltd., Beijing (CN)

( * ) Notice: Subject to any disclaimer, the term of this patent is extended or adjusted under 35 U.S.C. 154(b) by 0 days.

(21) Appl. No.: 16/624,287

(22) PCT Filed: May 14, 2019

(86) PCT No.: PCT/CN2019/086831
§ 371 (c)(1),
(2) Date: Dec. 18, 2019

(87) PCT Pub. No.: WO2020/019832
PCT Pub. Date: Jan. 30, 2020

(65) Prior Publication Data
US 2021/0010657 A1 Jan. 14, 2021

(30) Foreign Application Priority Data
Jul. 25, 2018 (CN) .......................... 201810828917.9

(51) Int. Cl.
*F21V 14/00* (2018.01)
*G02F 1/1335* (2006.01)
*G02F 1/1343* (2006.01)

(52) U.S. Cl.
CPC ...... *F21V 14/003* (2013.01); *G02F 1/133512* (2013.01); *G02F 1/134309* (2013.01)

(58) Field of Classification Search
None
See application file for complete search history.

(56) References Cited

U.S. PATENT DOCUMENTS 10,228,606 B2  3/2019 Wang et al.
2018/0081208 A1  3/2018 Zhao et al.
(Continued)

FOREIGN PATENT DOCUMENTS

CN   1320223 A   10/2001
CN   101218469 A   7/2008
(Continued)

OTHER PUBLICATIONS

Chinese Office Action dated Dec. 17, 2019, from application No. 201810828917.9.
(Continued)

*Primary Examiner* — Vip Patel
(74) *Attorney, Agent, or Firm* — Arch & Lake LLP

(57) ABSTRACT

A light regulation device includes: a first substrate on which a first electrode layer is provided; a second substrate on which a second electrode layer is provided; and liquid crystals interposed between the first substrate and the second substrate. The first electrode layer includes a plurality of electrode units. Each of the electrode units includes a plurality of electrode strips. Each of the electrode strips is configured to be loaded a different driving voltage signal. The second electrode layer is configured to be loaded a common voltage signal. An exiting direction of light passing through liquid crystals at a position corresponding to each of the electrode units is deflected in the same direction.

19 Claims, 4 Drawing Sheets

(56) References Cited

U.S. PATENT DOCUMENTS

2018/0107088 A1    4/2018  Wang et al.
2019/0204640 A1*   7/2019  Li .................... H04N 13/315
2019/0204708 A1    7/2019  Wang

FOREIGN PATENT DOCUMENTS

| CN | 103176308 A   | 6/2013  |
| CN | 103576399 A   | 2/2014  |
| CN | 103176308 B   | 10/2015 |
| CN | 105511179 A   | 4/2016  |
| CN | 105676511 A   | 6/2016  |
| CN | 205281069 U   | 6/2016  |
| CN | 205877967 U   | 1/2017  |
| CN | 107945760 A   | 4/2018  |
| CN | 108983530 A   | 12/2018 |
| KR | 20130106719 A | 9/2013  |
| KR | 101857819 B1  | 5/2018  |

OTHER PUBLICATIONS

International Search Report and Written Opinion dated Aug. 15, 2019, from application No. PCT/CN2019/086831.

* cited by examiner

LIGHT REGULATION DEVICE AND LIGHTING DEVICE

CROSS REFERENCE

The present application is based on International Application No. PCT/CN2019/086831, filed on May 14, 2019, which is based upon and claims priority to Chinese Patent Application No. 201810828917.9, filed Jul. 25, 2018, the entire contents of which are incorporated herein by reference.

TECHNICAL FIELD

The present disclosure relates to the field of lighting technologies, and more particularly, to a light regulation device and a lighting device.

BACKGROUND

Nowadays, some lighting devices can change brightness of emergent light therefrom, but cannot change an angle of the emergent light. As for the lighting devices applied to a vehicle such as a lamp, the lamp can be rotated at a certain angle by a mechanical structure disposed thereon, therefore, a light-exiting direction of light emitted from the lamp can be changed. As for the above manner, the mechanical mechanism needs to be disposed to change the light-exiting direction of the lighting device, thus increasing the size of the lighting device, thus making the lighting device heavy and cumbersome.

SUMMARY

The present disclosure provides a light regulation device and a lighting device to solve the deficiencies in relevant technologies.

According to a first aspect of arrangements of the present disclosure, there is provided a light regulation device. The light regulation device includes a first substrate on which a first electrode layer is provided. The light regulation device includes a second substrate on which a second electrode layer is provided. The light regulation device includes a surface of the first substrate on which the first electrode layer is provided being disposed opposite to a surface of the second substrate on which the second electrode layer is provided. The light regulation device includes liquid crystals interposed between the first substrate and the second substrate. The first electrode layer includes a plurality of electrode units. Each of the electrode units includes a plurality of electrode strips, each of the electrode strips being configured to be loaded a different driving voltage signal. The second electrode layer is configured to be loaded a common voltage signal. An exiting direction of light passing through liquid crystals at a position corresponding to each of the electrode units is deflected in the same direction.

In an example arrangement, for each of the electrode units, the driving voltage signals loaded on each of the electrode strips are gradually increased or decreased along a direction in which the electrode strips are arranged.

In an example arrangement, the first electrode layer includes an upper electrode layer and a lower electrode layer. An insulating layer is disposed between the upper electrode layer and the lower electrode layer. The first electrode layer includes the upper electrode layer includes a plurality of first electrode strips and the lower electrode layer includes a plurality of second electrode strips. The first electrode layer includes one of the second electrode strips is disposed at a position between every two adjacent first electrode strips, respectively. Each of the electrode units includes at least one of the first electrode strips and at least one of the second electrode strips that are continuously distributed.

In an example arrangement, projections of the adjacent first electrode strips on the first substrate abut against a projection of the second electrode strip on the first substrate.

In an example arrangement, a grating layer is further disposed on the second substrate and light is deflected after passing through the grating layer to increase a deflection angle of the light.

In an example arrangement, the grating layer includes a plurality of spaced-apart light-shielding strips, or the grating layer includes two dielectric layers having different refractive indexes. The two dielectric layers are alternately arranged.

In an example arrangement, the grating layer is located between the second substrate and the second electrode layer and a flat layer is further disposed on the grating layer.

In an example arrangement, the optical adjustment device includes a plurality of regions. Each of the regions has a different light deflection direction.

Each of the regions includes at least one electrode unit. Extension directions of electrode strips in the same region are the same, and extension directions of electrode strips in at least two regions are different. A deflection angle of liquid crystals at a position corresponding to an electrode unit in the region in which the extension directions of the electrode strips are the same has a different variation tendency. The extension directions of the electrode strips in the same region are the same as those of light-shielding strips in the region, or the extension directions of the electrode strips in the same region are the same as those of dielectric layers in the region.

In an example arrangement, an orientation direction of the liquid crystals is mutually perpendicular to or parallel to the extension directions of the electrode strips.

According to a second aspect of arrangements of the present disclosure, there is provided a lighting device. The lighting device includes a collimating light source and the light regulation device according to any one of the above arrangements. The light regulation device is disposed in a light-exiting direction of the collimating light source.

In an example arrangement, light of the collimating light source is polarized light.

In an example arrangement, the light of the collimating light source is natural light, and a polaroid is further disposed between the liquid crystals of the optical adjustment device and the collimating light source.

In an example arrangement, the light of the collimating light source is natural light. The light regulation device includes a first light regulation device and a second light regulation device superimposed on the light-exiting direction of the collimating light source. An orientation direction of liquid crystals of the first light regulation device are parallel to extension directions of electrode strips therein one another and an orientation direction of liquid crystals of the second light regulation device are perpendicular to extension directions of electrode strips therein one another.

In an example arrangement, a second substrate of the first light regulation device and a first substrate of the second light regulation device are the same common substrate. A first surface of the common substrate is provided with a second electrode layer of the first light regulation device and a second surface of the common substrate is provided with a first electrode layer of the second light regulation device, the second surface is a surface opposite to the first surface.

It is to be understood that both the foregoing general description and the following detailed description are example and explanatory only and are not restrictive of the disclosure, as claimed.

BRIEF DESCRIPTION OF THE DRAWINGS

The accompanying drawings, which are incorporated in and constitute a part of this specification, illustrate arrangements consistent with the disclosure and, together with the description, serve to explain the principles of the disclosure.

DETAILED DESCRIPTION

Figure 1:
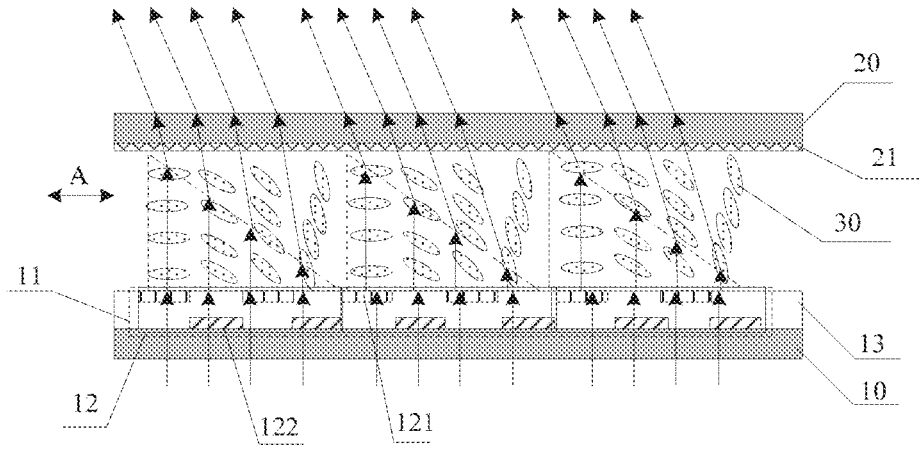
FIG. 1 is a cross-sectional view and a light path diagram illustrating a light regulation device according to an example arrangement of the present disclosure.

Reference will now be made in detail to example arrangements, examples of which are illustrated in the accompanying drawings. The following description refers to the accompanying drawings in which the same numbers in different drawings represent the same or similar elements unless otherwise represented. The implementations set forth in the following description of example arrangements do not represent all implementations consistent with the disclosure. Instead, they are merely examples of apparatuses and methods consistent with aspects related to the disclosure as recited in the appended claims.

As for the problem that the existing lighting devices are generally heavy and large in size since they use a mechanical structure to change their light-exiting direction, the present disclosure provides a light regulation device, which can change a light-exiting angle by liquid crystals cell structure without using a mechanical structure, and can be applied to a lighting device to reduce the size and weight thereof.

Several specific arrangements will be provided below for the detailed description of the technical solutions of the present application. The following specific arrangements can be combined with one another and the same or similar concepts or processes may not be elaborated in some of the arrangements.

An example arrangement of the present disclosure provides a light regulation device, including: a first substrate on which a first electrode layer is provided; a second substrate on which a second electrode layer is provided; a surface of the first substrate on which the first electrode layer is provided being disposed opposite to a surface of the second substrate on which the second electrode layer is provided; and liquid crystals interposed between the first substrate and the second substrate. The first electrode layer includes a plurality of electrode units. Each of the electrode units includes a plurality of electrode strips. Each of the electrode strips is configured to be loaded a different driving voltage signal. An exiting direction of light passing through liquid crystals at a position corresponding to the electrode unit is deflected in the same direction.

The first substrate is a substrate for carrying the first electrode layer and the second substrate is a substrate for carrying the second electrode layer. Both the first substrate and the second substrate can transmit light, and can be a rigid substrate such as a glass substrate or a flexible substrate such as a plastic substrate.

Liquid crystals is a special material whose state is between a solid state and a liquid state, and it is in a liquid state under normal conditions. Liquid crystals is an important optical material, and has optical anisotropy, i.e., birefringence characteristics. The birefringence characteristics of the liquid crystals are usually described with reference to a difference between a refractive index $n_e$ of extraordinary light (e-light) and a refractive index $n_o$ of ordinary light (O-light), i.e., $\Delta n = n_e - n_o$.

Liquid crystals molecules are rod-like. In a natural state, the rod-like molecules are randomly arranged and their orientation directions are not uniform. The orientation directions are directions in which long axes of the liquid crystals molecules are located. The liquid crystals molecules can be orientated in a certain direction by external actions. For example, a polymer layer (such as polyimide) is coated on a substrate, and then is oriented in a direction, the liquid crystals molecules distributed on a surface of the glass substrate can be aligned in a frictional direction to form a fixed orientation direction.

The above-mentioned liquid crystals may have an initial orientation direction. The liquid crystals is disposed between the first substrate and the second substrate. The first electrode layer and the second electrode layer are provided on the first substrate and the second substrate, respectively. The first electrode layer includes a plurality of electrode units, each of the electrode units includes a plurality of electrode strips, and each of the electrode strips is loaded a different voltage signal. The second electrode layer is loaded a common voltage signal. Therefore, for each of the electrode units, vertical electric fields perpendicular to both the first substrate and the second substrate may be formed between each of the electrode strips and the second electrode layer, respectively. Under the action of the applied electric field, the liquid crystals tends to be deflected in a direction perpendicular to the applied electric field, and it also tends to resume to an initial state due to its elastic properties. Under these two actions, the liquid crystals is at an angle with respect to the initial orientation direction, and the angle is called a deflection angle of the liquid crystals.

Since a different voltage signal is loaded on each of the electrode strips, for each of the electrode units, a deflection angle of liquid crystals at a position corresponding to each of the electrode strips is different. Therefore, the liquid crystals at the position corresponding to each of the electrode strips has a different refractive index value. When light passes through the liquid crystals at the position corresponding to each of the electrode strips, optical path differences at different positions are different. An exiting direction of light passing through the liquid crystals at the position corresponding to each of the electrode units can be deflected by controlling amplitude of voltage on each of the electrode strips. In addition, the exiting direction of light passing through the liquid crystals at the position corresponding to each of the electrode units is deflected in the same direction, thus an emitting direction of light can be adjusted.

After its exiting direction is deflected, light can be emitted after passing through the second substrate and the final deflection angle of the light is related to the refractive index difference Δn of the liquid crystals and the optical path difference between each of the electrode strips in each of the electrode units, the larger the refractive index difference Δn of liquid crystals is, the larger the optical path difference between each of the electrode strips is, and the larger the deflection angle of the light is.

As can be seen from the above description that the light regulation device can adjust a light-exiting direction by liquid crystals cell structure, without using a mechanical structure. The light regulation device is light and thin, and can be applied to the lighting device, which is beneficial to reducing size and weight of the lighting device, thus making the lighting device lighter and thinner.

In an optional arrangement, for each of the electrode units, the driving voltage signals loaded on each of the electrode strips are gradually increased or decreased along a direction in which the electrode strips are arranged.

In this arrangement, the voltage signals applied to each of the electrode strips are different, and the driving voltage signals loaded on each of the electrode strips are gradually increased or decreased along a direction in which the electrode strips of the electrode units are arranged, so that the deflection angles of the liquid crystals at the position corresponding to each of the electrode strips are gradually increased or decreased, that is, the deflection angles of the liquid crystals at the position corresponding to each of the electrode strips are different. Therefore, the liquid crystals at the position corresponding to each of the electrode strips has a different refractive index value. When light passes through the liquid crystals at the position corresponding to each of the electrode strips, optical path differences at different positions are different. Further, the optical path differences at different positions tend to be progressively decreased or increased. The liquid crystals at the position corresponding to each of the electrode units can be equivalent to an oblique prism, so that an emitting direction of light passing through the liquid crystals at the position corresponding to each of the electrode units is deflected.

An angle of inclination of the equivalent oblique prism can be controlled by controlling magnitude of a voltage value of the voltage signal loaded on each of the electrode strips in the electrode units. Further, the larger the angle of inclination of the equivalent oblique prism is, the larger the deflection angle of light is. Therefore, a deflection direction of the light can be controlled, that is, a light-exiting direction of the light can be adjusted.

FIG. 1 is a cross-sectional view illustrating a light regulation device according to an example arrangement. As illustrated in FIG. 1, the light regulation device includes: a first substrate 10 on which a first electrode layer 11 is provided; and a second substrate 20 on which a second electrode layer 21 is provided. A surface of the first substrate 10 on which the first electrode layer 11 is provided is disposed opposite to a surface of the second substrate 21 on which the second electrode layer 21 is provided. The light regulation device further includes liquid crystals 30 interposed between the first substrate 10 and the second substrate 20. The first electrode layer 11 includes a plurality of electrode units 12, each of which includes a plurality of electrode strips. The first electrode layer 11 includes an upper electrode layer (for example an electrode layer above an insulating layer 13 in FIG. 1) and a lower electrode layer (for example an electrode layer below the insulating layer 13 in FIG. 1). The insulating layer 13 is provided between the upper electrode layer and the lower electrode layer. The upper electrode layer includes a plurality of first electrode strips 121 and the lower electrode layer includes a plurality of second electrode strips 122. Each one of the second electrode strips 122 is provided at a position between every two adjacent first electrode strips 121, respectively. Each of the electrode units 12 includes at least one first electrode strip 121 and at least one second electrode strip 122 that are continuously distributed.

In this arrangement, the first electrode layer includes two electrode layers, which are the upper electrode layer and the lower electrode layer respectively and are insulated from each other through the insulating layer. The upper electrode layer includes a plurality of first electrode strips spaced apart from each other and the lower electrode layer includes a plurality of second electrode strips spaced apart from each other. Further, each one of the second electrode strips is provided at a position between every two adjacent first electrode strips, respectively. Namely, the first electrode strips and the second electrode strips are alternatively distributed. That is to say, a projection of each one of the second electrode strips on the first substrate is located between projections of every two adjacent first electrode strips on the first substrate. Each electrode unit includes a number of first electrode strips and a number of second electrode strips that are continuously distributed.

Since a same common voltage signal may be applied to each position of the second electrode layer, the second electrode layer may be a planar electrode. Namely, the second electrode layer is an overall planar structure formed on the second substrate without being divided into a plurality of electrode strips.

In the light regulation device of the above arrangement, the first electrode layer includes the upper and lower electrode layers. One electrode unit may be composed of a plurality of first electrode strips and a plurality of second electrode strips which are alternately provided and continuously distributed. Hereinafter, explanations will be made to an operating principle of the light regulation device by taking each electrode unit including two first electrode strips and two second electrode strips as an example.

Referring to FIG. 1, each of the electrode units 12, for example, includes continuously distributed four electrode strips, which are two first electrode strips 121 and two second electrode strips 122, respectively. An extension direction of each of the first electrode strips 121 is the same as that of each of the second electrode strips 122. For example, each of the first electrode strips 121 is extended in a longitudinal direction of the first substrate 10 and each of the second electrode strips 122 is extended in a longitudinal direction of the second substrate 20. The longitudinal directions of the first substrate 10 and the second substrate 20 are, for example, a direction directing toward the paper in FIG. 1. It is assumed that an initial orientation direction of the liquid crystals is a direction perpendicular to the extension directions of the electrode strips, for example, a direction indicated by a double arrow A in the figure.

Different voltage signals are applied to the two first electrode strips and the two second electrode strips of each of the electrode units, respectively. For convenience of description, the first electrode strips and the second electrode strips are herein referred to as the electrode strips. For example, voltages of the voltage signals applied to the four electrode strips arranged from left to right in FIG. 1 are $V_1$, $V_2$, $V_3$ and $V_4$ respectively, $V_1<V_2<V_3<V_4$ and a common voltage applied to the second electrode layer is $V_0$. Vertical electric fields perpendicular to both the first substrate and the second substrate may be formed between each of the electrode strips and the second electrode layer, respectively. Further, since the voltages applied to each of the electrode strips are sequentially increased, intensities of the vertical electric fields formed between each of the electrode strips arranged from left to right and the second electrode layer are gradually increased. For each of the electrode units, deflection forces exerted on the liquid crystals by the vertical electric fields formed from left to right are gradually increased, deflection angles of the liquid crystals are gradually increased and an optical path difference at each position is sequentially decreased. The liquid crystals at a position corresponding to each electrode unit may be equivalent to a triangular oblique prism whose inclination direction is inclination to the left as illustrated in FIG. 1, so that an exiting direction of light passing through the liquid crystals at the position corresponding to each electrode unit is defected to the left.

Figure 2:
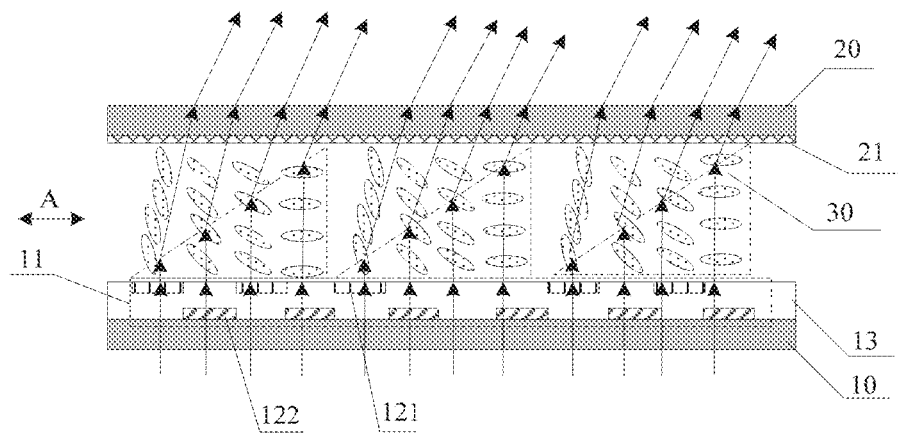
FIG. 2 is a cross-sectional view and a beam path diagram illustrating a light regulation device according to another example arrangement of the present disclosure.

For each electrode unit, if the voltages $V_1$, $V_2$, $V_3$ and $V_4$ of the voltage signals applied to the four electrode strips arranged from left to right are sequentially decreased, i.e., $V_1>V_2>V_3>V_4$, the liquid crystals at the position corresponding to each electrode unit may be equivalent to a triangular oblique prism which is inclined to the right as illustrated in FIG. 2. At this time, the exiting direction of light passing through the liquid crystals at the position corresponding to each electrode unit is deflected to the right.

In some examples, referring to FIG. 1, the projections of the adjacent first electrode strips 121 on the first substrate 10 abut against the projection of the second electrode strip 122 on the first substrate 10. That is to say, edges of the adjacent first electrode strips 121 are flush with an edge of the second electrode strip 122.

For each of the electrode units, since different voltage signals are applied to the two adjacent electrode strips, a weak fringe electric field will be formed therebetween. In order to reduce influence exerted by the fringe electric field on the deflection angle of the liquid crystals, in the present arrangement, edges of the adjacent first and second electrode strips are located on the same plane, so that the electric field formed between the adjacent first and second electrode strips is distributed in the direction perpendicular to both the first substrate and the second substrate. After experimental analysis, the electric field and the vertical electric fields between the first electrode layer and the second electrode layer are superimposed to act together on liquid crystals molecules, thus facilitating gradual changes in the deflection angles of the liquid crystals at positions corresponding to the electrode units, so that light emitted at each position is more uniform.

According to the description of the foregoing arrangements, the liquid crystals at the position corresponding to each electrode unit can be equivalent to an oblique prism; and the fact that a deflection angle of light will be influenced when a base angle of the oblique prism differs will be further explained based on experimental data by taking a triangular oblique prism as an example.

Figure 3:
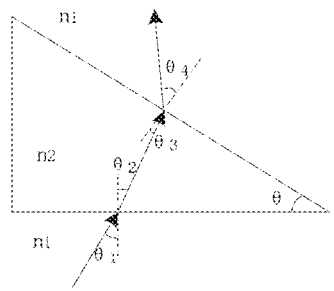
FIG. 3 is a light path diagram illustrating a triangular oblique prism according to an example arrangement of the present disclosure.

FIG. 3 is a schematic diagram illustrating deflection of light. FIG. 3 shows a triangular oblique prism, where its base angle is θ, an incident angle of light (an angle contained by the light and a normal line) is $θ_1$, a refractive index of a medium before the light is incident on the prism is $n_1$, a refractive index of the oblique prism is $n_2$, the light is incident on a bottom surface of the oblique prism and refracted by the oblique prism, at this time, its angle of emergence is $θ_2$, the light is then refracted by an inclined plane of the oblique prism, at this time, an incident angle of the light on the inclined plane is $θ_3$ and its an angle of emergence is $θ_4$.

According to the principle of refraction, $\sin θ_1 * n_1 = \sin θ_2 * n_2$, $\sin θ_3 * n_2 = \sin θ_4 * n_1$, according to the principle of the inner angles of a triangle, $90 - θ_2 + 90 - θ_3 + θ = 180$, and $θ_2 = θ - θ_3$.

The deflection angle of the light after being refracted by the oblique prism is β, $β = θ_4 - θ_3 + θ_1 - θ_2 = θ_4 - θ_1 - θ$, and it indicates the ability of the oblique prism to deflect the light. Therefore, the deflection angle is related to the base angle θ of the oblique prism, the incident angle $θ_1$ of the light and the refractive index $n_2$ of the oblique prism.

The table below indicates the deflection angle β of light when the refractive index of the liquid crystals $n_e = 1.8$, $n_o = 1.5$, the incident angle $θ_1$ of light becomes different angles and the base angle θ of the triangular oblique prism to which the liquid crystals at the position corresponding to the electrode unit is equivalent becomes different angles.

|      | 10°      | 20°      | 30°      | 40°      | 50°    | 60°    |
| ---  | ---      | ---      | ---      | ---      | ---    | ---    |
| −30° | −2.98694 | −7.45256 | −18.0832 | num !    | num !  | num !  |
| −20° | −2.4497  | −5.62637 | −10.614  | num !    | num !  | num !  |
| −10° | −2.16002 | −4.70005 | −8.07915 | −13.6693 | num !  | num !  |
| 0°   | −2.0273  | −4.23148 | −6.8699  | −10.4748 | −16.82 | num !  |
| 30°  | −2.01576 | −4.05944 | −6.31469 | −9.06519 | −12.94 | −20.3  |
| 20°  | −2.12055 | −4.12927 | −6.19548 | −8.51241 | −11.4  | −15.6  |
| 10°  | −2.36356 | −4.44816 | −6.455   | −8.55267 | −10.95 | −14.01 |

In the above table, a horizontal direction indicates the base angle θ of the oblique prism and a longitudinal direction indicates the incident angle $θ_1$ of light. For each angle in the above table, the incident angle $θ_1$ when the incident light is located on the left side of the normal line is indicated by a positive number and the incident angle $θ_1$ when the incident light is located on the right side of the normal line is indicated by a negative number. The fact that the deflection angle β is a negative number indicates that the emitted light is deflected to the right along the normal line, and the deflection angle β in the table is num! indicates that the light is totally reflected in the oblique prism and cannot be emitted out of the oblique prism. As can be seen from the above table that when the base angle θ of the oblique prism is within a certain range, the larger the base angle θ is, the larger the deflection angle of the light is, thus the base angle θ of the equivalent oblique prism can be changed by controlling a change in amplitude of voltage of the voltage signal applied to each electrode strip of the electrode unit and the inclination direction of the oblique prism may be changed to deflect light in different directions. Therefore, the light regulation device in this arrangement can adjust the deflection angle of the light so that the light is emitted in different directions, or deflected in two completely different directions and it is applicable to a lighting device to adjust its light-exiting direction.

As can be seen from the above table that when the incident angle $θ_1$ of the light differs, the deflection angle β of light also differs; and in order to allow the emitted light to be deflected in two different directions symmetrically, for example, a deflection angle of light deflected to the left and a deflection angle of light deflected to the right fall into the same range, the incident angle $\theta_1$ of the light can be 0°. Namely, a collimating light source is used as a light source and a light regulation device can be disposed in a light-exiting direction of light from the collimating light source, thus forming a lighting device. Light emitted from the collimating light source is an incident light and an incident angle of the incident light is approximately equal to 0°, and the light-exiting direction is defected by the light regulation device to adjust a light-exiting direction of the lighting device.

Figure 4:
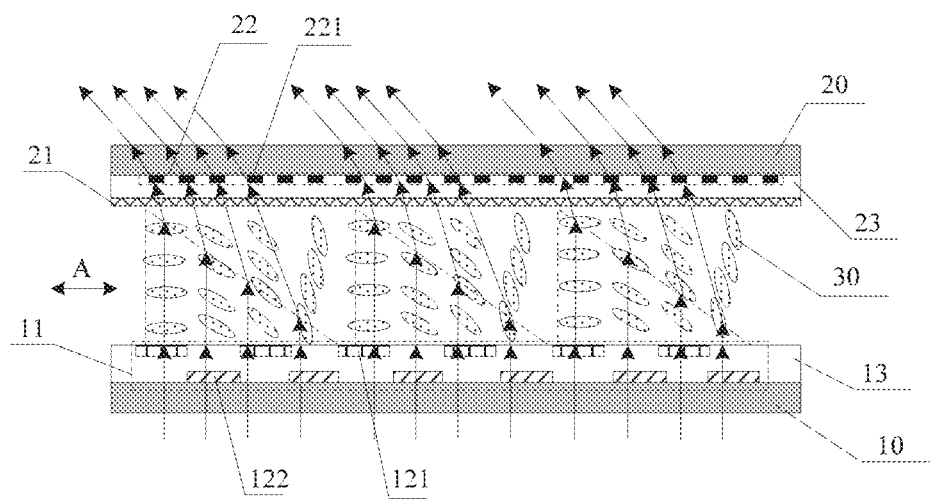
FIG. 4 is a cross-sectional view and a beam path diagram illustrating a light regulation device according to another example arrangement of the present disclosure.

In some examples, as illustrated in FIG. 4, a grating layer 22 may be disposed on the second substrate 20 and light is deflected by the grating layer 22 after passing therethrough to increase the deflection angle of the light.

Light will be refracted and also deflected at a certain angle when passing through an interface between two different media. For example, as illustrated in FIG. 4, when passing through the second substrate 20 to be incident into air, light will be refracted at an interface between the second substrate 20 and air so that the light will be further deflected, but its deflection angle is quite small. In order to further increase the deflection angle of the light and widen an adjustable range of a light-exiting direction, in this arrangement, further, the grating layer 22 is disposed on the second substrate 20 and the deflection angle of the light can be further increased by diffraction of the grating layer and after the light is refracted by the grating layer 22 and the interface between the second substrate 20 and air, its deflection angle can be continuously adjusted within a large angle range.

The foregoing grating layer 22 is illustrated in FIG. 4, and may include, for example, a plurality of light-shielding strips 221 that are alternatively provided to form a multi-slit grating. Alternatively, the grating layer may also be a phase grating (also referred to as a dielectric grating). The dielectric grating includes two dielectric layers having different refractive indexes, which are alternately arranged to form a grating layer structure and light can also be diffracted and the deflection angle of light can also be increased. The use of the dielectric grating does not exert an influence on a light transmittance, which is beneficial to the improvement of brightness of a backlight source.

The above-described light-shielding strips can be extended in a certain direction of the second substrate, for example, a horizontal direction or a longitudinal direction of the second substrate; or for the grating layer composed of the two dielectric layers, which may have the same extension direction, or can also be extended in a certain direction of the second substrate, for example, a horizontal direction or a longitudinal direction of the second substrate.

The grating layer 22 described above can be disposed between the second substrate 20 and the second electrode layer 21. Further, in order to increase the flatness of the grating layer 22, a flat layer 23 can be disposed on the grating layer 22.

In an optional arrangement, the light regulation device includes a plurality of regions, each of which has a different light deflection direction.

Each of the regions includes at least one electrode unit, electrode strips in the same region have the same extension directions, and electrode strips in at least two regions have different extension directions.

The deflection angle of the liquid crystals at the position corresponding to the electrode unit in the region in which the electrode strips are extended in the same direction has a different variation tendency.

The extension directions of the electrode strips in the same region are the same as those of the light-shielding strips in the region, or the extension directions of the electrode strips in the same region are the same as those of the dielectric layers in the region.

By the above arrangement, light deflection directions in different regions of the light regulation device are different, thus multiple deflection directions of the light can be controlled and the requirements for light emitting in multiple directions can be met.

Figure 5:
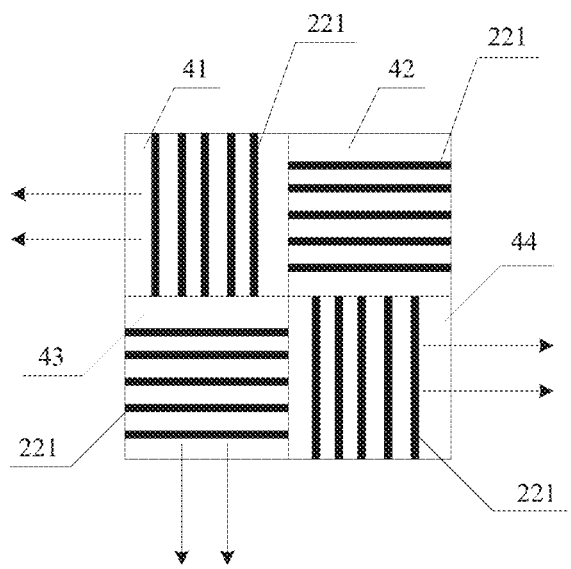
FIG. 5 is a top view illustrating a light regulation device according to an example arrangement of the present disclosure.

FIG. 5 is a schematic diagram illustrating a planar structure of a light regulation device. The light regulation device includes four regions, which are a first region 41, a second region 42, a third region 43 and a fourth region 44, respectively in the figure. Each of the regions has a different light deflection direction and in order to describe the light deflection directions, a center line in a thickness direction of the light regulation device is taken as a reference direction, the left side in the figure is a direction directing from the center line to the left, the right side in the figure is a direction directing from the center line to the right, a direction in the figure directing toward the inside of the paper is a downward direction from the center line and a direction in the figure directing toward the outside of the paper is an upward direction from the center line.

For example, light in the first region 41 is deflected to the left along the center line, light in the second region 42 is deflected downward along the center line, light in the third region 43 is deflected upward along the center line and light in the fourth region 44 is deflected to the right along the center line.

Specifically, referring to FIG. 5, taking the grating layer 22 including a plurality of light-shielding strips 22 that are alternatively provided as an example, the extension directions of the electrode strips (not illustrated in FIG. 5) are the same as those of the light-shielding strips 221 in the first region 41, i.e., a longitudinal direction of the first substrate, and the extension directions of the electrode strips and the light-shielding strips 221 in both the first region 41 and the fourth region 44 are the same; and the extension directions of the electrode strips are the same as those of the light-shielding strips 221 in the second region 42, i.e., a horizontal direction of the first substrate, and the extension directions of the electrode strips and the light-shielding strips 221 in both the second region 42 and the third region 43 are the same.

Further, a variation tendency of a deflection angle of liquid crystals at a position corresponding to an electrode unit in the first region 41 is different from a variation tendency of a deflection angle of liquid crystals at a position corresponding to an electrode unit in the fourth region 44. For example, for each of the electrode units in the first region 41, the deflection angles of the liquid crystals from left to right are gradually decreased along an arrangement direction of the electrode strips; and for each of the electrode units in the fourth region 44, the deflection angles of the liquid crystals from left to right are gradually increased.

Referring to FIG. 2, it is assumed that for each of the electrode units in the first region 4, voltage signals $V_1$, $V_2$, $V_3$ and $V_4$ applied to the electrode strips arranged from left to right are gradually decreased and liquid crystals at a position corresponding to each of the electrode units in the first region can be equivalent to the triangular oblique prism illustrated in FIG. 2 and deflection angles of the liquid crystals from left to right are gradually decreased. An orientation direction of the liquid crystals is, for example, a direction perpendicular to the extension directions of the electrode strips. At this time, an exiting direction of light passing through the liquid crystals at the position corresponding to each of the electrode units is deflected to the right along the center line, therefore, light passing through the first region is deflected to the right along the center line.

Similarly, for each of the electrode units in the fourth region, voltage signals $V_1$, $V_2$, $V_3$ and $V_4$ applied to the electrode strips arranged from left to right are gradually increased and liquid crystals at a position corresponding to each of the electrode units in the fourth region can be equivalent to the triangular oblique prism illustrated in FIG. 1 and deflection angles of the liquid crystals from left to right are sequentially increased. Light passing through the liquid crystals at the position corresponding to each of the electrode units is deflected to the left along the center line, therefore, light passing through the fourth region is deflected to the left along the center line.

Similarly, for both the second region and the fourth region, a variation tendency of a deflection angle of liquid crystals at a position corresponding to an electrode unit in the second region is different from a variation tendency of a deflection angle of liquid crystals at a position corresponding to an electrode unit in the third region. For example, for each of the electrode units in the second region, the deflection angles of the liquid crystals from top to bottom are gradually decreased along an arrangement direction of the electrode strips; and for each of the electrode units in the third region, the deflection angles of the liquid crystals from top to bottom are gradually increased along an arrangement direction of the electrode strips.

It is assumed that for each of the electrode units in the second region, voltage signals $V_1$, $V_2$, $V_3$ and $V_4$ applied to the electrode strips arranged from top to bottom are gradually decreased and a deflection angle from top to bottom of liquid crystals at a position corresponding to each of the electrode units in the second region is gradually decreased. An orientation direction of the liquid crystals is, for example, a direction perpendicular to the extension directions of the electrode strips and the extension directions of the electrode strips in the second region are a horizontal direction of the first substrate, which are different from the extension directions of the electrode strips in both the first and fourth regions. At this time, an exiting direction of light passing through the liquid crystals at the position corresponding to each of the electrode units is deflected downward along the center line (a direction directing toward the inside of the paper in the figure). Therefore, light passing through the second region is deflected downward along the center line.

Similarly, for each of the electrode units in the third region, voltage signals $V_1$, $V_2$, $V_3$ and $V_4$ applied to the electrode strips arranged from top to bottom are gradually increased and a deflection angle from top to bottom of liquid crystals at a position corresponding to each of the electrode units in the third region is sequentially increased. The extension directions of the electrode strips in the fourth region are a horizontal direction of the first substrate, which are different from the extension directions of the electrode strips in both the first and fourth regions. Light passing through the liquid crystals at the position corresponding to each of the electrode units is deflected upward along the center line. Therefore, light passing through the fourth region is deflected upward along the center line.

As can be seen from the above description that the deflection directions of light are related not only to the amplitude of the voltages of the voltage signals applied to the electrode strips of each electrode unit in the first electrode layer, i.e., the variation tendency of the deflection angle of the liquid crystals, but also to the extension directions of the electrode strips and the extension directions of the light-shielding strips in the grating layer.

The deflection directions of the light can be changed by setting the extension directions of the electrode strips and the extension directions of the light-shielding strips in the grating layer. Therefore, when the light regulation device is used to control the multiple deflection directions of the light, the light regulation device can be divided into a plurality of regions, each including a different deflection direction of light, thus controlling the multiple deflection directions of the light and meeting the requirements for light emitting in multiple directions.

In the above figures, only the extension directions of the electrode strips and the light-shielding strips in each region are exemplarily illustrated. Those skilled in the art may set other extension directions of the electrode strips and the light-shielding strips (or dielectric layers) according to their needs, which are not limited to the directions illustrated in the drawings.

Liquid crystals usually refracts a polarized light of a polarization direction to deflect the light at a certain angle, for example, a p-polarized light of a first polarization direction or an s-deflected light of a second polarization direction. A polarized light in which kind of deflection state is refracted is related to an orientation direction of the liquid crystals. Therefore, the orientation direction of the liquid crystals can be set to be perpendicular to or parallel to the extension directions of the electrode strips.

Figure 6:
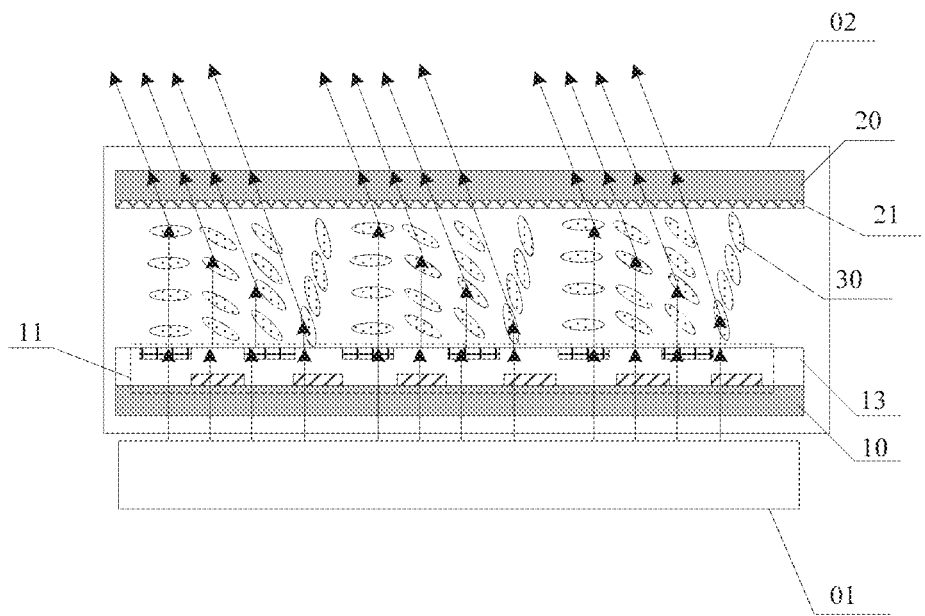
FIG. 6 is a cross-sectional view illustrating a lighting device according to an example arrangement of the present disclosure.

An arrangement of the present disclosure further provides a lighting device. As illustrated in FIG. 6, the lighting device includes a collimating light source 01 and the light regulation device 02 described in any of the above arrangements. The light regulation device 02 is disposed in a light-exiting direction of the collimating light source 01.

In the lighting device, the collimating light source is used as a light source and the light regulation device is disposed in the light-exiting direction of the collimating light source. Light emitted from the collimating light source is used as an incident light and an incident angle of the incident light is substantially equal to 0°, and the light is deflected by the light regulation device to achieve the adjustment of the light-exiting direction of the lighting device.

In some examples, the light of the collimating light source can be polarized light, which is refracted by liquid crystals in the light regulation device to be deflected at a certain angle.

Figure 7:
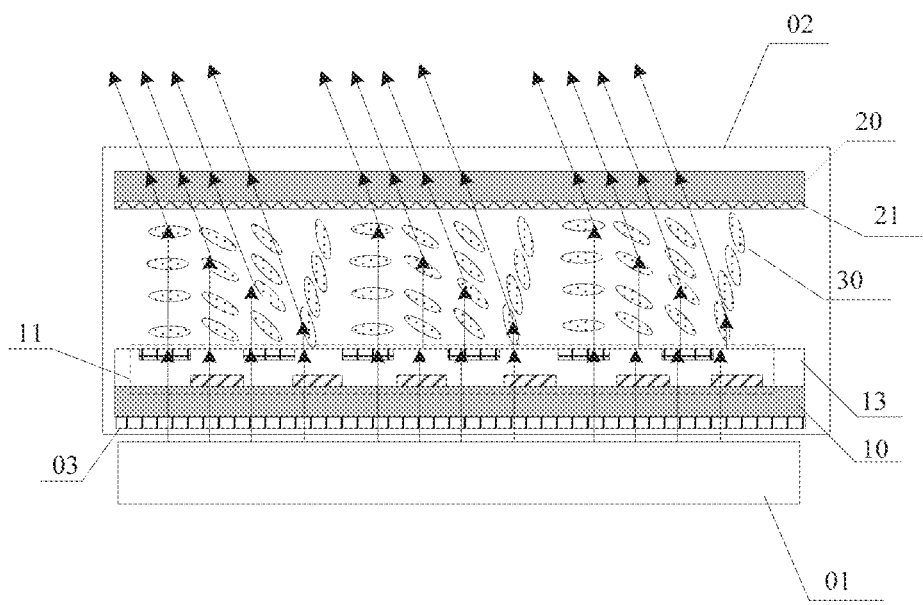
FIG. 7 is a cross-sectional view illustrating a lighting device according to another example arrangement of the present disclosure.

The light of the collimating light source can also be natural light. In this case, in the lighting device as illustrated in FIG. 7, a polaroid 03 can be disposed between liquid crystals 30 of an optical adjustment device 02 and a collimating light source 01.

The light of the collimating light source is incident into the liquid crystals of the light regulation device after passing through the first substrate and the natural light emitted from the collimating light source can be converted into polarized light by providing the polaroid between the collimating light source and the liquid crystals, then the polarized light is refracted by the liquid crystals to be deflected at a certain angle.

The above-described polaroid can be disposed on a side of the first substrate close to the collimating light source; or it can be disposed on a side of the first substrate away from the collimating light source, for example, above or below the first electrode layer, which is not limited to in this arrangement.

The collimating light source described above can include a plurality of LEDs arranged in a matrix and a reflective cover or a geometric lens is disposed on the LEDs.

In an optional arrangement, in the lighting device, the light of the collimating light source is natural light.

The light regulation device includes a first light regulation device and a second light regulation device superimposed on the light-exiting direction of the collimating light source.

An orientation direction of liquid crystals of the first light regulation device are parallel to extension directions of electrode strips therein one another and an orientation direction of liquid crystals of the second light regulation device are perpendicular to extension directions of electrode strips (for example, first and second electrode strips in FIG. 8) therein one another.

In this arrangement, two kinds of light regulation devices, i.e., the first and second light regulation devices are disposed in the light-exiting direction of the collimating light source. The liquid crystals in the two light regulation devices have different orientation directions, and may respectively refract the polarized light of two different polarization states in the light from the collimating light source, which can increase the brightness of the lighting device.

Figure 8:
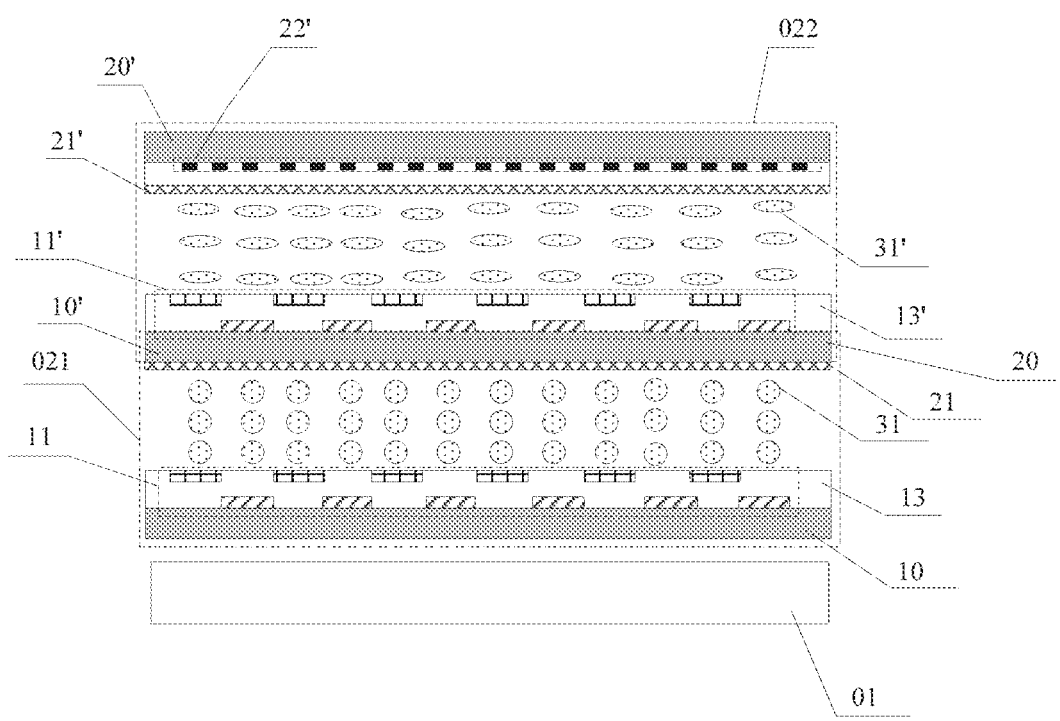
FIG. 8 is a cross-sectional view illustrating a lighting device according to still another example arrangement of the present disclosure.

FIG. 8 is a cross-sectional view of a lighting device according to an example arrangement. Referring to FIG. 8, the lighting device includes a collimating light source 01, a first optical adjustment device 021 and a second light regulation device 022. The first optical adjustment device 021 and the second light regulation device 022 are superimposed in a light-exiting direction of the collimating light source 01.

The first optical adjustment device 021 is, for example, the light regulation device illustrated in FIG. 1, and specifically includes: a first substrate 10 on which a first electrode layer 11 is provided and a second substrate 20 on which a second electrode layer 21 is provided; and liquid crystals 31 provided between the first substrate 10 and the second substrate 20. The first electrode layer 11 includes an upper electrode layer and a lower electrode layer and an insulating layer 13 is disposed between the upper electrode layer and the lower electrode layer.

The second light regulation device 022 is similar in structure to the first optical adjustment device 021, and also includes a first substrate 10' on which a first electrode layer 11' is provided and a second substrate 20' on which a second electrode layer 21' is provided; and liquid crystals 31' provided between the first substrate 10' and the second substrate 20'. The first electrode layer 11' includes an upper electrode layer and a lower electrode layer and an insulating layer 13' is disposed between the upper electrode layer and the lower electrode layer.

The second light regulation device 022 is different from the first optical adjustment device 021 in that the liquid crystals 31' in the second light regulation device 022 has a different orientation direction from that of the liquid crystals 31 in the first light regulation device 021, the orientation direction of the liquid crystals 31 in the first light regulation device 021 is a direction parallel to extension directions of electrode strips therein, such as a direction directing toward the inside of the paper in the figure and the orientation direction of the liquid crystals 31' in the second light regulation device 022 is a direction perpendicular to extension directions of electrode strips therein, such as a horizontal direction in the figure.

In the above lighting device, light of the collimating light source is natural light, and includes polarized light of two polarization directions, which are p-polarized light and s-deflected light respectively. For the first light regulation device, the liquid crystals therein refracts the p-polarized light to deflect it, but does not refract the s-deflected light, so the s-deflected light can pass through the first light regulation device directly; and for the second light regulation device, the liquid crystals therein refracts the s-polarized light to deflect it, but the p-polarized light passes through the second light regulation device directly after being refracted by the first light regulation device. Therefore, the lighting device can refract the polarized light of two directions in the light emitted from the collimating light source to improve the utilization ratio of the light source, which is beneficial to improving the brightness of the lighting device.

The above lighting device can be used as a lamp on a vehicle and a deflection direction of light emitted from the lamp can be adjusted according to the need. For example, when the vehicle turns left, the light emitted from the lamp can be controlled to be deflected to the left and when the vehicle turns right, the light emitted from the lamp can be controlled to be deflected to the right, thus meeting the needs of the vehicle for different light-exiting directions of the lamp, and which is beneficial to the improvement of user experience and product competitiveness.

It should be noted that, in order to increase a deflection angle of the light, as illustrated in FIG. 8, a grating layer 22' can be disposed only on the second substrate 20' of the second light regulation device 022 away from the collimating backlight source 01. The deflection angle of the light is further increased by the grating layer 22' before being emitted to the air from the second light regulation device 022. A grating layer can be certainly disposed on both the second substrate of the first light regulation device and the second substrate of the second light regulation device, which is not limited by the present disclosure.

The above lighting device is only an application scenario provided by the arrangement and a person skilled in the art can design different combinations of the grating layer, the electrode layer and the orientation direction of the liquid crystals in the optical adjustment device of the lighting device according to their needs for different application scenarios, thus meeting different requirements for illumination, which is not limited by the present disclosure.

In order to further reduce a thickness of the foregoing lighting device, as illustrated in FIG. 8, the second substrate 20 of the first light regulation device 021 and the first substrate 10' of the second light regulation device 022 may be the same common substrate (for example, the second substrate 20 in the figure), that is, both of them share one substrate. The second electrode layer 21 is disposed on a first surface of the common substrate, and it is the second electrode layer of the first light regulation device 021 and the first electrode layer 11' is disposed on a second surface (a surface opposite to the first surface on which the second electrode layer 21 is disposed) of the common substrate, and it is the first electrode layer 11' of the second light regulation device 022.

The above-mentioned FIG. 8 shows only a structure of a lighting device provided by an example arrangement. The first light regulation device and the second light regulation device included in the lighting device can also adopt the light regulation device provided by any of the above arrangements, which is not limited by the present disclosure.

Other arrangements of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as example only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A light regulation device, comprising:
    a first substrate, a first electrode layer being provided on the first substrate;
    a second substrate, a second electrode layer being provided on the second substrate;
    a surface of the first substrate on which the first electrode layer is provided being disposed opposite to a surface of the second substrate on which the second electrode layer is provided; and
    liquid crystals interposed between the first substrate and the second substrate;
    wherein the first electrode layer comprises a plurality of electrode units, each of the electrode units comprising a plurality of electrode strips, each of the electrode strips being configured to be loaded a different driving voltage signal, and wherein the second electrode layer is configured to be loaded a common voltage signal;
    the first electrode layer comprises an upper electrode layer and a lower electrode layer, and an insulating layer is disposed between the upper electrode layer and the lower electrode layer;
    the upper electrode layer comprises a plurality of first electrode strips and the lower electrode layer comprises a plurality of second electrode strips;
    a projection of one of the second electrode strips on the first substrate is located between projections of every two adjacent ones of the first electrode strips on the first substrate, edges of adjacent first electrode strips are flush with edges of the second electrode strip; and
    each of the electrode units comprises at least one of the first electrode strips and at least one of the second electrode strips that are continuously distributed; and
    an exiting direction of light passing through liquid crystals at a position corresponding to each of the electrode units is deflected in the same direction.

2. The light regulation device according to claim 1, wherein
    for each of the electrode units, the driving voltage signals loaded on each of the electrode strips are gradually increased or decreased along a direction in which the electrode strips are arranged.

3. The light regulation device according to claim 1, wherein
    the projections of the every two adjacent first electrode strips on the first substrate abut against the projection of one of the second electrode strips on the first substrate.

4. The light regulation device according to claim 1, wherein
    a grating layer is further disposed on the second substrate and light is deflected after passing through the grating layer to increase a deflection angle of the light.

5. The light regulation device according to claim 4, wherein the grating layer comprises a plurality of spaced-apart light-shielding strips.

6. The light regulation device according to claim 5, wherein
    the grating layer is located between the second substrate and the second electrode layer and a flat layer is further disposed on the grating layer.

7. The light regulation device according to claim 5, wherein
    an optical adjustment device comprises a plurality of regions, each of the regions having a different light deflection direction;
    each of the regions comprises at least one electrode unit, extension directions of electrode strips in the same region are the same, and extension directions of electrode strips in at least two regions are different;
    a deflection angle of liquid crystals at a position corresponding to an electrode unit in the region in which the extension directions of the electrode strips are the same has a different variation tendency; and
    the extension directions of the electrode strips in the same region are the same as those of light-shielding strips in the region, or the extension directions of the electrode strips in the same region are the same as those of dielectric layers in the region.

8. The light regulation device according to claim 1, wherein
    an orientation direction of the liquid crystals is mutually perpendicular to or parallel to the extension directions of the electrode strips.

9. A lighting device, comprising a collimating light source and a light regulation device, the light regulation device comprising:
    a first substrate, a first electrode layer being provided on the first substrate;
    a second substrate, a second electrode layer being provided on the second substrate;
    a surface of the first substrate on which the first electrode layer is provided being disposed opposite to a surface of the second substrate on which the second electrode layer is provided; and
    liquid crystals interposed between the first substrate and the second substrate;
    the first electrode layer comprises a plurality of electrode units, each of the electrode units comprising a plurality of electrode strips, each of the electrode strips being configured to be loaded a different driving voltage signal, and wherein the second electrode layer is configured to be loaded a common voltage signal;
    the first electrode layer comprises an upper electrode layer and a lower electrode layer, and an insulating layer is disposed between the upper electrode layer and the lower electrode layer;
    the upper electrode layer comprises a plurality of first electrode strips and the lower electrode layer comprises a plurality of second electrode strips;
    a projection of one of the second electrode strips on the first substrate is located between projections of every two adjacent ones of the first electrode strips on the first substrate, edges of adjacent first electrode strips are flush with edges of the second electrode strip; and
    each of the electrode units comprises at least one of the first electrode strips and at least one of the second electrode strips that are continuously distributed; and
    an exiting direction of light passing through liquid crystals at a position corresponding to each of the electrode units is deflected in the same direction, wherein the light regulation device is disposed in a light-exiting direction of the collimating light source.

10. The lighting device according to claim 9, wherein light of the collimating light source is polarized light.

11. The lighting device according to claim 9, wherein the light of the collimating light source is natural light, and a polaroid is further disposed between the liquid crystals of the optical adjustment device and the collimating light source.

12. The lighting device according to claim 9, wherein the light of the collimating light source is natural light;
the light regulation device comprises a first light regulation device and a second light regulation device superimposed on the light-exiting direction of the collimating light source;
an orientation direction of liquid crystals of the first light regulation device are parallel to extension directions of electrode strips therein one another and an orientation direction of liquid crystals of the second light regulation device are perpendicular to extension directions of electrode strips therein one another.

13. The lighting device according to claim 12, wherein a second substrate of the first light regulation device and a first substrate of the second light regulation device share a same common substrate;
a first surface of the common substrate is provided with a second electrode layer of the first light regulation device and a second surface of the common substrate is provided with a first electrode layer of the second light regulation device, the second surface is a surface opposite to the first surface.

14. The light regulation device according to claim 4, wherein
the grating layer comprises two dielectric layers having different refractive indexes, the two dielectric layers being alternately arranged.

15. The light regulation device according to claim 2, wherein
an orientation direction of the liquid crystals is mutually perpendicular to or parallel to the extension directions of the electrode strips.

16. The lighting device according to claim 9, wherein for each of the electrode units, the driving voltage signals loaded on each of the electrode strips are gradually increased or decreased along a direction in which the electrode strips are arranged.

17. The lighting device according to claim 9, wherein the first electrode layer comprises an upper electrode layer and a lower electrode layer, and an insulating layer is disposed between the upper electrode layer and the lower electrode layer;
the upper electrode layer comprises a plurality of first electrode strips and the lower electrode layer comprises a plurality of second electrode strips;
a projection of one of the second electrode strips on the first substrate is located between projections of every two adjacent first electrode strips on the first substrate; and
each of the electrode units comprises at least one of the first electrode strips and at least one of the second electrode strips that are continuously distributed.

18. The lighting device according to claim 17, wherein the projections of the every two adjacent first electrode strips on the first substrate abut against the projection of one of the second electrode strips on the first substrate.

19. The lighting device according to claim 9, wherein a grating layer is further disposed on the second substrate and light is deflected after passing through the grating layer to increase a deflection angle of the light.

* * * * *